J. A. SMITH.
SPEED GOVERNOR FOR TYPE WRITING MACHINES.
APPLICATION FILED APR. 24, 1911.
1,169,293.
Patented Jan. 25, 1916.
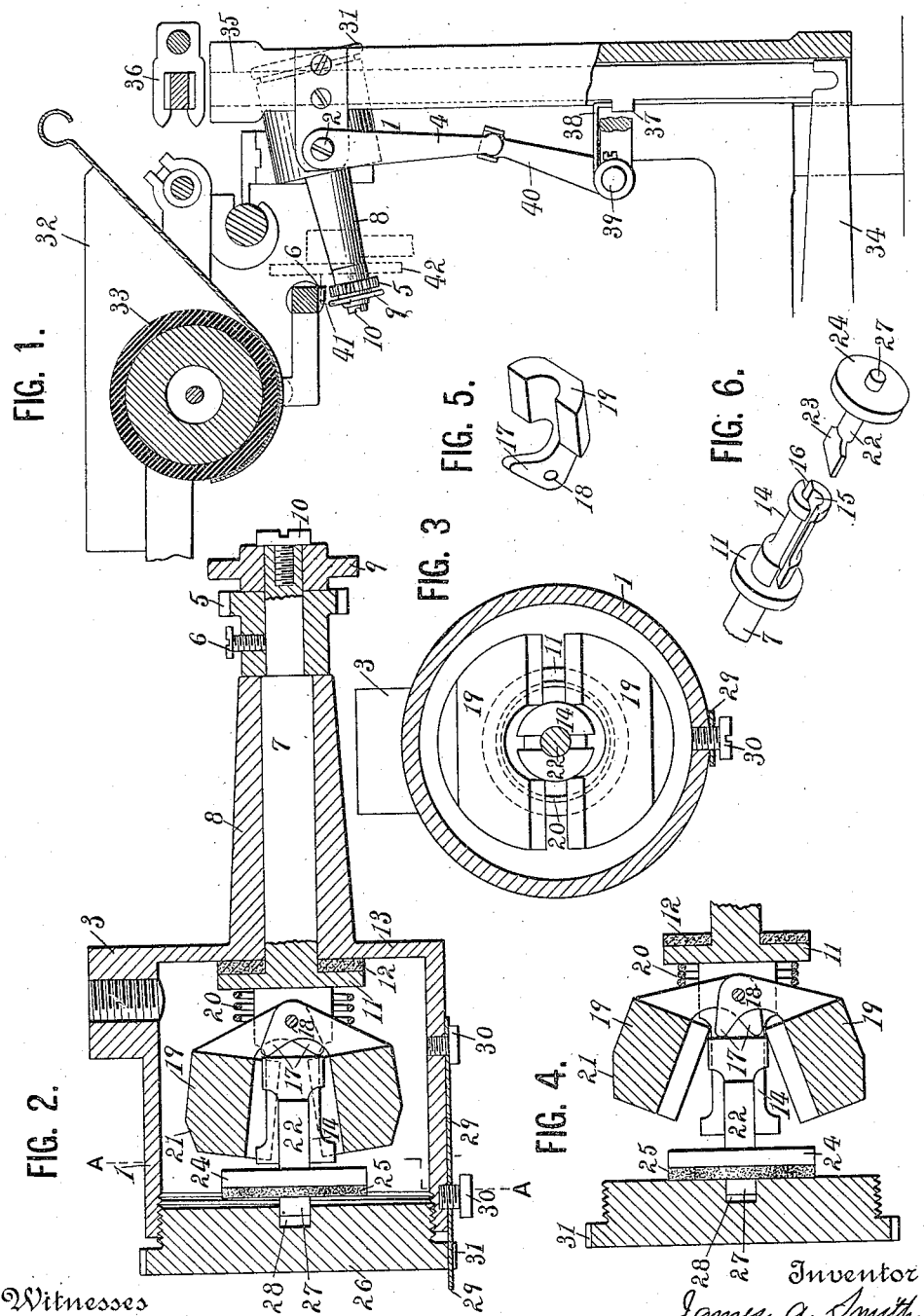
Witnesses
J. A. Brophy
F. W. Wiman
Inventor
James A. Smith
BY
B. C. Stickney
Attorney

UNITED STATES PATENT OFFICE.

JAMES A. SMITH, OF EAST HARTFORD, CONNECTICUT, ASSIGNOR TO UNDERWOOD TYPEWRITER COMPANY, OF NEW YORK, N. Y., A CORPORATION OF DELAWARE.

SPEED-GOVERNOR FOR TYPE-WRITING MACHINES.

1,169,293. Specification of Letters Patent. Patented Jan. 25, 1916.

Application filed April 24, 1911. Serial No. 622,852.

*To all whom it may concern:*

Be it known that I, JAMES A. SMITH, a citizen of the United States, residing in East Hartford, in the county of Hartford and State of Connecticut, have invented certain new and useful Improvements in Speed-Governors for Type-Writing Machines, of which the following is a specification.

This invention relates to improvements in speed governors for the power driven carriages of typewriting and tabulating machines.

In the patent to F. A. Young, No. 957,294, May 10, 1910, the speed governor is attached to a rock shaft and carries a pinion which is caused to engage with a gear on the carriage-driving spring barrel. To adjust the brake members, requires the removal of the speed governor from its support, to give access to the threaded bushing which serves to adjust the brake members, and to tighten a lock nut which is provided for said bushing.

The object of my invention is to provide a governor having simple means for adjusting the brake members, preferably without necessitating the removal of any part whatever from the machine and preferably without requiring the aid of any tool.

In the preferred form of this invention, the governor casing is rocked by the movement of the tabulating keys, and a gear mounted on a spindle provided for carrying certain brake members, meshes with the carriage rack. The adjustment of the governor is accomplished by turning a cap which threads into the casing and is directly accessible to the operator. The turning of the cap causes it to press against certain brake members carried on the spindle; and provision is made to prevent said cap from loosening.

In the accompanying drawings, Figure 1 shows the speed governor as applied to an Underwood writing machine. Fig. 2 is a longitudinal section of the governor. Fig. 3 is an end view of Fig. 2, and shows the casing in cross section on the line A—A. Fig. 4 is a sectional view showing the detail parts in operation. Fig. 5 is a perspective view of the weight and cam detail. Fig. 6 is a perspective of the spindle members.

The casing 1 is fixed on a rock-shaft 2 by means of a tapped hub 3, and it is rocked by lever 4, which is secured on shaft 2 and forms a part of the tabulating devices of the machine, so that the pressing down of a tabulating key will cause the gear 5, fixed on the governor spindle, to be lifted into mesh with the usual rack bar 6.

The gear 5 is rigidly fastened, by means of a set screw 6', on a spindle 7, which is journaled on a hub 8 extending from the casing 1. A guide roller 9, having a larger diameter than gear 5, is mounted on the end of the spindle adjacent to said gear, and serves for pressing against the rack bar when it is in mesh with the gear, so as to prevent the teeth from binding against each other; the roller 9 being held in place by the cap screw 10. A flange 11 is formed on the spindle within the casing, and a friction-washer 12 is interposed between said flange and the wall 13 of the casing; the spindle being maintained in longitudinal position by this flange and the fastening of gear 5.

The part 14 of the spindle which extends from flange 11 within the casing, has a bore 15 and a longitudinal slit 16. Cam projections or arms 17 are disposed within said slit and are similarly pivoted on the pin 18, which passes through the spindle transversely to its axis. The cam projections 17 carry the weights 19, which normally are maintained in the idle position shown in Fig. 2 by a helical spring 20 pressing against the edges of the cam projections 17, but which are swung outward, as shown in Fig. 4, by centrifugal force when rotated by the spindle 7; said weights having beveled surfaces 21, to clear the wall of casing 1 when swung outward.

A rod 22 is slidable longitudinally within the bore 15 and has a flattened projection 23, which fits the slit 16 and bears against cams 17. On the rod 22 is formed a flange 24, which has a loose friction washer 25, adjacent thereto. The weights 19, when swinging outward, cause the cam projections 17 to force the bar 22 outward, which movement amounts to a lengthening of the spindle and thereby an extension of the distance between the friction washers 12 and 25. The accurate adjustment of the extension of the spindle and the maximum distance desired between the friction washers 12 and 25 is effected by threading the cap 26 into the casing; this permits the longitudinal movement of the extension bar 22 to be varied thereby permitting any desired friction to be obtained between washer 25 and the inner wall of cap 26, and between washer 12 and wall 13.

A projection 27 extends centrally from flange 24 for holding the loose washer 25, and it is fitted in a corresponding guide cavity 28, formed in cap 26, to insure accurate axial movement of the extension bar 22. To prevent the cap 26 from unscrewing, a band spring 29 is fastened on the casing 1 by screws 30, and the end of said spring presses against the edge 31 of cap 26, to yieldingly lock it, although the cap can be readily rotated for adjustment by the operator. The edge 31 is preferably milled to afford a better hold for the fingers and a firmer friction against the pressure of spring 29. Said rack 6 is hinged upon a carriage 32, upon which is mounted a platen 33. The tabulator keys are usually placed upon the forward ends of levers 34, which rise to lift stops 35 to position to intercept column-stops 36 mounted on said carriage. The stops 35 have lugs 37 to engage a universal bar 38, the latter fixed to a rock shaft 39 from which rises a rock arm 40 having a loose engagement with the arm 4 that swings the member 8 up to lift the carriage rack 6 from a pinion 41 with which it is normally in mesh; said pinion connected to an escapement wheel 42 of usual construction.

Variations may be resorted to within the scope of the invention, and portions of the improvements may be used without others.

Having thus described my invention, I claim:

1. In a speed governor, the combination with a casing and a two-part spindle mounted therein and extending from side to side thereof, means on each of said parts for engagement with the wall of the casing, and speed controlled means for extending the length of said spindle so as to bring said means into contact with the walls of the casing and thereby regulate speed.

2. In a speed governor, the combination with a casing and a two-part spindle mounted therein and extending across from one side to the other thereof, of speed-actuated means for extending said spindle lengthwise in response to speed of rotation, means on each part of said spindle for engaging the walls of said casing, and an adjustable device within one of said walls for controlling the degree of extension of said spindle.

3. In a speed governor, the combination with a casing and a two-part spindle mounted therein and extending across from one side to the other thereof, of speed-actuated means for extending said spindle lengthwise in response to speed of rotation, means on each part of said spindle for engaging the walls of said casing, an adjustable device within one of said walls for controlling the degree of extension of said spindle, and means to lock said adjustable means.

4. In a speed governor, the combination with a casing and a two-part spindle mounted therein and extending across from one side to the other thereof, of speed-actuated means for extending said spindle lengthwise in response to speed of rotation, means on each part of said spindle for engaging the walls of said casing, and a cap threading into one of the casing sides and adjustable in the direction of the axis to limit the extension of said spindle.

5. In a speed governor, the combination with a casing and a two-part spindle mounted therein extending from wall to wall thereof, of weights pivotally mounted on one part of said spindle, means on the other part of said spindle with which said weights are in engagement, friction means on said other part adapted to engage a wall of said casing, and friction means on the first part adapted to engage another wall of the casing, the arrangement being such that when the speed of rotation exceeds a certain degree, centrifugal force causes the weights to push the two parts of the spindle apart into engagement with the respective walls of the casing.

6. In a speed governor, the combination with a casing and a two-part spindle mounted rotatably therein and extending from side to side thereof, of weights pivoted upon one part of said spindle and provided each with a cam extension, a bearing surface on the other part of said spindle on which said cam extensions engage, a spring on the first part of said spindle for holding said weights in ineffective position, and friction means on one of the two parts of said spindle for engagement with a wall of the casing, said spring being so proportioned and adjusted to said weights that when the speed of rotation exceeds a certain degree, centrifugal force will cause the weights, by reason of the cam extensions and their engagement with the second part of the spindle, to extend the spindle and bring said friction disk into engagement with the wall of the casing.

7. In a speed governor, the combination with a two-part shaft, of a flange thereon, a friction disk lying outside of said flange, an abutment against which said disk bears, a second flange slidably splined on said shaft, a second abutment, a friction disk interposed between said slidable flange and said second abutment, and weights pivoted on said shaft comprising extensions adapted to thrust said slidable flange to cause said friction disks to bind against their abutments.

8. In a speed governor, the combination with a casing, of a shaft extending part way through said casing, a flange fast on said shaft, a friction disk between said flange and said casing, a flange slidably splined on said shaft, a friction disk between said slidable flange and said casing, weights pivoted on said shaft so that they normally lie close to said shaft, and extensions on said weights adapted by centrifugal force to thrust said flanges against their friction disks.

9. In a speed governor, the combination of a main shaft formed with a slot therein and a bore extending from said slot to the end of the shaft, a shaft formed to fit said bore and provided with a flange, splines on said flanged shaft to fit in said slot, weights pivoted at their ends, extensions on said weights adapted to thrust said flanged shaft along said main shaft and extend it, a flange fast on said main shaft, friction disks outside of said flanges, and fixed abutments against which the friction disks bear.

10. In a speed governor, the combination of a two-part shaft, one of said parts being provided with a slot and the other of said parts being provided with a projection engaging said slot whereby the two parts of the shaft are longitudinally movable but angularly fixed, weights lying outside of said shaft and normally adjacent thereto, a pivot carrying said weights extending within said slot, flanges always turning with said shaft, means for moving said flanges in opposite directions by the centrifugal force of said weights, and abutments limiting the outward movement of said flanges.

11. In a speed governor, the combination of a two-part shaft, one of said parts being provided with a slot and the other of said parts being provided with a projection engaging said slot whereby the two parts of the shaft are longitudinally movable but angularly fixed, weights lying outside of said shaft and normally adjacent thereto, a pivot carrying said weights extending within said slot, flanges always turning with said shaft, means for moving said flanges outwardly in opposite directions by the centrifugal force of said weights, abutments limiting the outward movement of said flanges, and means for adjusting the distance between said abutments.

12. In a speed governor, the combination with a main shaft, of an extension splined thereto, a casing in which said main shaft is journaled, a head adjustable on said casing in which said splined section is journaled, weights pivoted to one of said shaft sections, means for sliding one of said sections on the other by the centrifugal force of said weights, a flange for each section, and a friction disk for each flange bearing against said casing.

13. In a speed governor, the combination with a casing, of a separable shaft extended from side to side thereof, a gear on one part of said shaft, weights pivoted on the gear part of said shaft, a bore in said gear part of said shaft in which the second part of said shaft slides, means connecting the two parts of the shaft angularly but permitting longitudinal movement, cam extensions on said weights in engagement with the second part of said shaft, a spring in engagement with said cam extensions to hold the weights inert, and friction surfaces on each part of said shaft adapted to engage the walls of the casing, the arrangement being such that when the rotative speed of the shaft exceeds a certain degree centrifugal force will overcome the spring and force the friction surface into engagement with the walls of the casing.

14. In a speed governor, the combination with a casing, a two-part shaft, each part provided with friction means and extending from side to side of the casing, and centrifugally actuated weights pivoted on one part of said shaft and engaging with the other part to thrust the two parts of the shaft into contact with the walls of the casing.

15. In a speed governor for a typewriting and tabulating machine, the combination of a casing, a shaft journaled therein, disks connected to rotate with the shaft, friction members interposed between the disks and the ends of the casing, weights rotatable with the shaft, and means operated by the centrifugal force of the weights to move the disks in opposite directions and thereby compress said friction members between the disks and the opposite ends of the casing.

16. In a speed governor for a typewriting and tabulating machine, the combination of a casing, disks connected to rotate together within the casing, friction devices interposed between the disks and the ends of the casing, a weight connected to one of said disks to rotate therewith, and means operated by the centrifugal force of the weight to move said disks outward in opposite directions and cause the friction devices to bear against the opposite ends of the casing.

17. In a speed governor for a typewriting and tabulating machine, the combination of a casing, a shaft journaled therein, a flange or disk carried by said shaft, a second disk connected to rotate with the shaft, friction members interposed between said disks and the ends of the casing, and a weight operating by centrifugal force to move one of said disks toward one end of the casing and reacting to move the other disk toward the other end of the casing, thereby compressing said friction members between the disks and casing.

18. In a speed governor for a typewriting and tabulating machine, the combination of a cylindrical casing having a cap threaded therein and forming one end thereof, the opposite end of the casing formed with an extension having a longitudinal bore therein, a shaft journaled in said bore, a flange formed on said shaft, a second flange connected to rotate with said shaft, friction members between said flanges and the ends of the casing, weights connected to said shaft, and cams on said weights operable by centrifugal force to spread said disks and cause said friction members to bear against the opposite ends of the casing, said cap adjustable to vary the pressure of said friction members for a given speed of the shaft.

19. In a speed governor for a typewriting and tabulating machine, the combination of a casing, a shaft mounted in said casing and extending from side to side thereof, a gear mounted near one end of said shaft, centrifugally actuated weights pivoted on said shaft within the casing, a spring for holding said weights in inert position, said shaft being provided at its end opposite the gear end with an extension, a friction disk on said extension adapted to engage a wall of the casing, and connections between said extension and weights, whereby, whenever speed of rotation causes centrifugal force to overcome the effect of the spring, said extension will be thrust forward until the disk engages said wall of the casing.

JAMES A. SMITH.

Witnesses:
MORTON C. TALCOTT,
FRANK A. COOK.

Copies of this patent may be obtained for five cents each, by addressing the "Commissioner of Patents, Washington, D. C."